A. E. & D. Lazell,
Bread Cutter,
Nº 8,193.    Patented July 1, 1851.
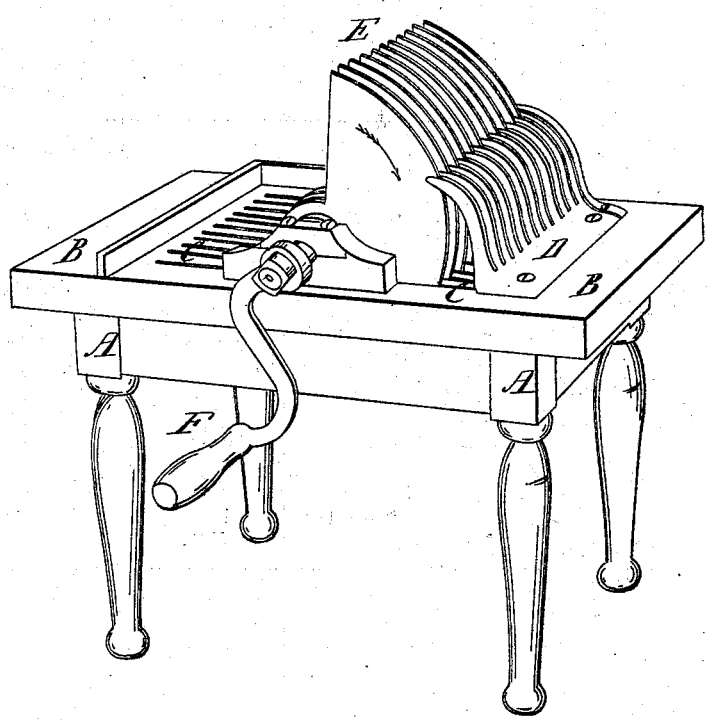
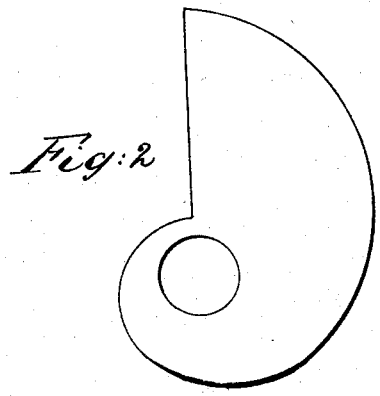
Fig: 2

UNITED STATES PATENT OFFICE.

A. E. LAZELL AND D. LAZELL, OF CHICOPEE FALLS, MASSACHUSETTS.

BREAD-CUTTER.

Specification of Letters Patent No. 8,193, dated July 1, 1851.

*To all whom it may concern:*

Be it known that we, ALMON E. LAZELL and DAVENPORT LAZELL, both of Chicopee Falls, in the county of Hampden and State of Massachusetts, have invented a new and useful Improvement in Machinery for Cutting Bread; and we do hereby declare that the following is a full, clear, and exact description of the construction and operation of the same, reference being had to the accompanying drawings, which make a part of this specification, in which—

Figure 1, is a perspective view of the machine, showing the knives in their position soon after they have commenced cutting; the fingers, or prongs, which hold the bread against the knives as serving for guides, and the bars or ribs which guide and support the knives at all times, and also support the bread before and after it is cut. Fig. 2 is a plan, or side view of one of the knives before it is attached to the arbor, showing its form.

Our improvement consists in fitting a set of knives, each made in the form of an eccentric circle, to an arbor and having them work in guides, and with holders, in such a manner that by causing them to revolve, by means of a crank, (or otherwise,) a whole loaf may be cut into suitable slices, at every revolution, without breaking or crushing the bread.

We make a suitable frame A, A, Fig. 1. On this we place a suitable bed piece, B, B. The central part of this bed piece we construct of bars or ribs, as seen at C, & C, Fig. 1. These bars being of the thickness we design to cut the slices of bread, (say half an inch,) they serve to sustain the loaf while cutting, and also to guide the knives.

We make the knives of steel, in the form of eccentric circles, spiral lines, or scrolls, as seen in Fig. 2, the cutting edge being on the periphery or spiral line. We fit these knives on a shaft, as seen in Fig. 1, at the proper distance from each other to correspond with the bars C, C, so that the knives may pass between them, and be guided and steadied by them. We make a set, or series, of fingers, or prongs, D, Fig. 1, which we attach to the bed piece in such a position that the spaces between them will correspond with the spaces between the bars, C, C, so that these fingers serve both to hold the loaf against the cutters while cutting and as outside guides to that part of the knives which is most distant from the shaft and most liable to tremble.

The number of bars, C, C, the fingers D, and the knives, E, should be equal to the number of slices into which a loaf is to be cut; and the thickness of the bars, and fingers, and the spaces between the knives should be equal to the desired thickness of the slice.

When the machine is complete, as represented in Fig. 1, by means of the crank, F, (or by any other convenient means,) we turn the knives forward until the extreme points, (at E,) pass down below the bars C, C. We then place the loaf on the bars, C, C, between the knives, E, and the fingers, D, when, by continuing to turn the crank in the direction indicated by the dart, the whole loaf will be cut into slices of equal thickness without crushing or breaking the bread.

The advantages of our improvement over all other methods of cutting bread, consist in so shaping and arranging the knives, holders, and guides, that the whole loaf may be cut at one revolution, and by the eccentric edges of the knives cutting so gradually that there will be no danger of breaking the bread, even though it be stale, or of crushing it, when quite new. And the guides being composed of the bars, or ribs, below, and the fingers above, the center, the slices will be cut with perfect accuracy, and at right angles to the length of the loaf. And a whole loaf may be cut as quickly as a single slice by any other contrivance now known.

What we claim as our invention, and desire to secure by Letters Patent, is—

The use of a series of knives, or cutters (E) made in the form of eccentric circles, or scrolls, with the cutting edge on the periphery, so as to represent a spiral line, or curve, (as seen in the drawings), when combined with the bars, or ribs, (C, C,) of the bed piece which serves to sustain the loaf, and also to guide the knives and with the fingers, or prongs, (D,) which hold the loaf against the knives while cutting, and also act as outside guides, when the whole is constructed, arranged, combined, and operating, substantially as herein described.

A. E. LAZELL.
  DAVENPORT LAZELL.

Witnesses:
 PLINY CALDWELL,
 GUY DAVENPORT.